United States Patent [19]

Akita et al.

[11] 4,384,262
[45] May 17, 1983

[54] TEMPERATURE RESPONSIVE ASTABLE MULTIVIBRATOR

[75] Inventors: Sigeyuki Akita; Hiroaki Tanaka, both of Okazaki, Japan

[73] Assignee: Nippon Soken, Inc., Nishio, Japan

[21] Appl. No.: 248,443

[22] Filed: Mar. 27, 1981

[30] Foreign Application Priority Data

Apr. 2, 1980 [JP] Japan ................................. 55-43353

[51] Int. Cl.³ ..................... G01K 7/00; H03K 3/282
[52] U.S. Cl. ................................ 331/66; 331/113 R; 340/584; 340/598; 374/145; 374/178
[58] Field of Search ............. 331/66, 113 R; 340/584, 340/595, 598; 374/145, 178

[56] References Cited

U.S. PATENT DOCUMENTS 2,984,729  5/1961  Hykes et al. ...................... 331/66 X
4,184,126  1/1980  Jaskolski et al. ...................... 331/66

FOREIGN PATENT DOCUMENTS 527607  9/1976  U.S.S.R. ............................... 374/178

Primary Examiner—Siegfried H. Grimm
Attorney, Agent, or Firm—Cushman, Darby & Cushman

[57] ABSTRACT

In an oscillator circuit responsive to a predetermined temperature and including an astable multivibrator, a switching transistor inverts an output voltage from a first transistor of the multivibrator with a predetermined time delay, and a feedback capacitor is responsive to the inverted output voltage from the switching transistor to bias a reference capacitor connected between the output terminal of the first transistor and the input terminal of a second transistor of the multivibrator at opposite voltage polarity relative to that of a terminal voltage across the reference capacitor, a capacitance of the feedback capacitor being determined to turn off the second transistor due to the bias of the feedback capacitor when ambient temperature becomes the predetermined one under exposure of the second transistor to the ambient temperature.

4 Claims, 7 Drawing Figures

TEMPERATURE RESPONSIVE ASTABLE MULTIVIBRATOR

BACKGROUND OF THE INVENTION

The present invention relates to oscillator circuits, and more particularly to an oscillator circuit of the temperature response type suitable for being used, for example, as a signal generator of a temperature sensor for detecting ambient temperature.

A conventional oscillator circuit has been proposed of which the oscillating frequency changes in dependence upon variation of ambient temperature. With the oscillator circuit, it has been, however, experienced that it is difficult to precisely determine an optimum oscillating frequency corresponding to a desired ambient temperature, because the oscillating frequency changes at a small changing rate relative to variation of the ambient temperature.

SUMMARY OF THE INVENTION

It is, therefore, a primary object of the present invention to provide an oscillator circuit of the temperature response type of which the oscillating frequency suddenly changes at a desired ambient temperature to ensure precise detection of the desired temperature.

It is another object of the present invention to provide an oscillator circuit of the temperature response type, having the above-mentioned characteristics, which is capable of facilitating digital control of various electronic devices due to the sudden change of the oscillating frequency.

According to the present invention, the above objects are accomplished by provision of an oscillator circuit responsive to a predetermined ambient temperature, comprising:

an astable multivibrator including a first transistor, and a second transistor connected at its input terminal to the output terminal of the first transistor through a first capacitor and at its output terminal to the input terminal of the first transistor through a second capacitor, each of the capacitors being connected between a pair of resistors for defining a pair of time constants, and at least one of the transistors being arranged to be exposed to an ambient temperature;

first means for receiving an output voltage appearing at the output terminal of the first transistor and for producing an inverted output voltage with a predetermined time delay; and second means responsive to the inverted output voltage from the first means for applying a bias voltage to the first capacitor and the input terminal of the second transistor at opposite voltage polarity relative to that of a terminal voltage appearing across the first capacitor, the value of the bias voltage being determined in such a way to turn off one of the transistors in relation to the bias voltage when the ambient temperature becomes the predetermined one.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
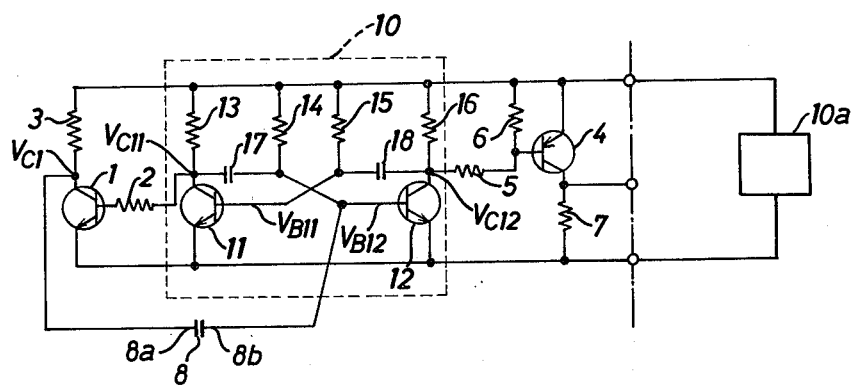
FIG. 1 is a circuit diagram of an oscillator circuit of the temperature response type in accordance with the present invention.

Referring now to FIG. 1 of the drawings, there is illustrated a circuit diagram of an oscillator circuit of the temperature response type in accordance with the present invention which includes a conventional astable multivibrator 10. The astable multivibrator 10 comprises a first NPN transistor 11 which is provided with an emitter, with a base connected to a junction between a resistor 15 and a capacitor 18 and with a collector connected through a resistor 13 to the positive terminal of a constant voltage source 10a. The collector of first transistor 11 is also connected to the positive terminal of constant voltage source 10a through a reference capacitor 17 and a resistor 14. The astable multivibrator 10 further comprises a second NPN transistor 12 which is provided with an emitter connected to the emitter of first transistor 11 and the negative terminal of constant voltage source 10a, with a base connected to a junction between the reference capacitor 17 and the resistor 14 and with a collector connected through a resistor 16 to the positive terminal of constant voltage source 10a. The collector of second transistor 12 is also connected to the positive terminal of constant voltage source 10a through the capacitor 18 and the resistor 15. When the astable multivibrator 10 receives a constant voltage from constant voltage source 10a, the first and second transistors 11 and 12 are alternatively turned on and off to conduct oscillation in the multivibrator 10 with a time period which is defined by resistance values of resistors 14 and 15 and capacitance values $C_{17}$ and $C_{18}$ of capacitors 17 and 18. In the embodiment, the resistance values of resistors 14 and 15 are predetermined larger than those of the resistors 13 and 16 respectively.

The oscillator circuit further comprises an additional NPN transistor 1 which is provided with an emitter connected to the emitter of first transistor 11, with a base connected to the collector of first transistor 11 through a resistor 2 and with a collector connected to the positive terminal of constant voltage source 10a through a resistor 3. An additional or feedback capacitor 8 is connected at its one terminal 8a to the collector of additional transistor 1 and also connected at its other terminal 8b to the base of second transistor 12 or the junction between the reference capacitor 17 and the resistor 14. This means that the feedback capacitor 8 is biased in voltage polarity opposite to that of the reference capacitor 17.

An output transistor 4 is provided with an emitter connected to the positive terminal of constant voltage source 10a and with a collector connected to the negative terminal of constant voltage source 10a through a resistor 7. A base of output transistor 4 is connected through a resistor 5 to the collector of second transistor 12 and also connected through a resistor 6 to the positive terminal of constant voltage source 10a. In addition, the collector of output transistor 4 serves as an output terminal of the oscillator circuit in accordance with the present invention. In the embodiment, it should be noted that the turning on and off of each of transistors 1, 11 and 12 is conducted in relation to a base saturation voltage $V_{BE}$ of each of transistors 1, 11 and 12 and that the base saturation voltage $V_{BE}$ lowers in dependence upon increase of ambient temperature around each of transistors 1, 11 and 12, as is conventionally known in the prior arts.

Operational modes of the oscillator circuit of which electric elements are exposed to a predetermined ambient temperature will be described below in detail with reference to FIGS. 2 and 3.

Figure 2:
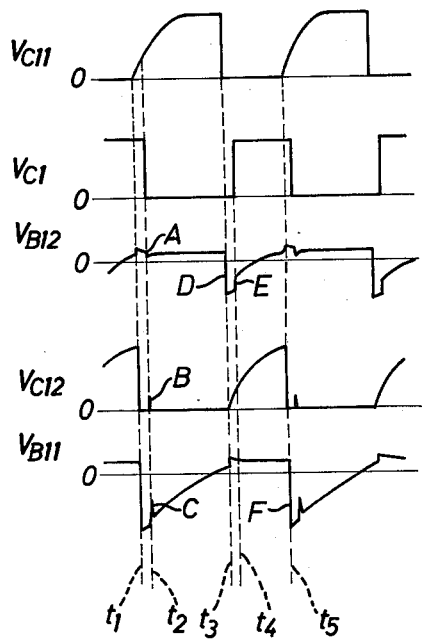
FIGS. 2 and 3 respectively depict waveforms obtained at various points in the oscillator circuit of FIG. 1.

(1) In case the capacitance value $C_8$ of feedback capacitor 8 is selected in a smaller value relative to the capacitance value $C_{17}$ of reference capacitor 17:

Assuming that the first and second transistors 11 and 12 are respectively turned off and on at time $t=t_1$ shown in FIG. 2, an electric voltage $V_{C11}$ appearing at the collector of first transistor 11 starts to gradually rise up with a predetermined time constant defined by the capacitance value $C_{17}$ of reference capacitor 17 and the resistance value of resistor 13, whereas an electric voltage $V_{C12}$ appearing at the collector of second transistor 12 is maintained in a zero value, as shown in FIG. 2, such that the output transistor 4 is turned on to produce an output signal with a high value at its output terminal. An electric voltage $V_{B11}$ appearing at the base of first transistor 11 also starts to gradually rise up with a predetermined time constant defined by the resistance value of resistor 15 and the capacitance value of capacitor 18, whereas an electric voltage $V_{B12}$ appearing at the base of second transistor 12 is maintained substantially in the base saturation value $V_{BE}$. At this stage, the additional transistor 1 is maintained nonconductive due to time necessary for arrival of a base voltage of transistor 1 to the base saturation value $V_{BE}$ and time delay defined by inherent propagation-time-delay characteristics of transistor 1. Thus, an electric voltage $V_{C1}$ appearing at the collector of additional transistor 1 is maintained in a high value such that the feedback capacitor 8 is positively charged at its one terminal 8a and negatively charged at its other terminal 8b.

When the additional transistor 1 is turned on at time $t=t_2$ to drop the collector voltage $V_{C1}$ to a zero value, an electric voltage appearing at the positively charged terminal 8a of feedback capacitor 8 is lowered to the zero value to temporarily drop the base voltage $V_{B12}$ of second transistor 12 below the base saturation voltage $V_{BE}$, as shown at a point A of FIG. 2. Then, the electric voltage $V_{C12}$ of zero value appearing at the collector of second transistor 12 temporarily rises up due to the drop of the base voltage $V_{B12}$, as shown at a point B of FIG. 2. Subsequently, the base voltage $V_{B11}$ of first transistor 11 temporarily rises up, as shown at a point C of FIG. 2, under control of the capacitor 18 responsive to the rise of the collector voltage $V_{C12}$. When the feedback capacitor 8 is charged by the reference capacitor 17 receiving an electric current through the resistor 13 from constant voltage source 10a, the base voltage $V_{B12}$ of second transistor 12 rises up to the saturation value $V_{BE}$, whereas the collector voltage $V_{C12}$ of transistor 12 drops to zero value so that the base voltage $V_{B11}$ of first transistor 11 again rises up with the time constant defined by the resistance value of resistor 15 and the capacitance value of capacitor 18.

When the base voltage $V_{B11}$ of first transistor 11 rises up to the saturation value $V_{BE}$ at time $t=t_3$, the first transistor 11 is turned on to drop the collector voltage $V_{C11}$ to the zero value in response to which the base of second transistor 12 is biased negatively in voltage under control of the reference capacitor 17, as shown at a point D of FIG. 2. Thus, the second transistor 12 is turned off so that the output transistor 4 is turned off to produce an output signal with a zero value at its output terminal. At this stage, the additional transistor 1 is maintained conductive due to the same reason as that at time $t=t_1$.

When the additional transistor 1 is turned off at time $t=t_4$ of FIG. 2, the collector voltage $V_{C1}$ of zero value of transistor 1 is made a high value to instantly raise up the base voltage $V_{B12}$ of second transistor 12 under control of the capacitor 8, as shown at a point E of FIG. 2. At this stage, the feedback capacitor 8 is charged with the electric current which flows from the constant voltage source 10a through the resistor 3 to the reference capacitor 17. When the feedback capacitor 8 is fully charged, the base voltage $V_{B12}$ of second transistor 12 starts to again rise up with the time constant defined by the resistance value of resistor 14 and the capacitance value $C_{17}$ of reference capacitor 17.

When the base voltage $V_{B12}$ of second transistor 12 rises up to the saturation value $V_{BE}$ at time $t=t_5$, the second transistor 12 is turned on to drop the collector voltage $V_{C12}$ to the zero value in response to which the base of first transistor 11 is biased negatively in voltage under control of the capacitor 18, as shown at a point F of FIG. 2. Thus, the first transistor 11 is turned off to again conduct the same operation as that at time $t=t_1$. Thereafter, the above-noted operation is repeated to conduct oscillation in the oscillator circuit.

Figure 3:
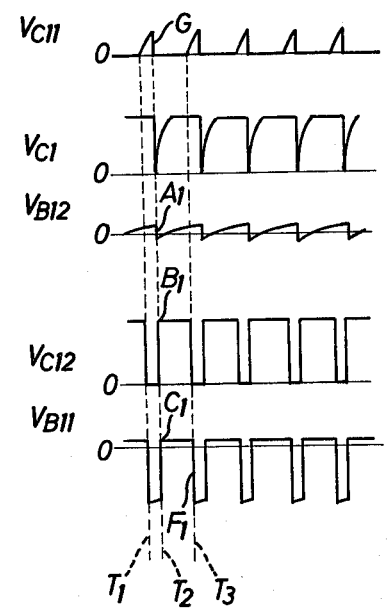

(2) In case the capacitance value $C_8$ of feedback capacitor 8 is selected in a larger value relative to the capacitance value $C_{17}$ such that the base voltage $V_{B11}$ shown at the point C of FIG. 2 accords with the base saturation voltage $V_{BE}$ of first transistor 11:

Assuming that the first and second transistors 11 and 12 are respectively turned off and on at time $t=T_1$ shown in FIG. 3, base and collector voltages $V_{B11}$ and $V_{C11}$ of first transistor 11 respectively start to gradually rise up in the same manner as that at time $t=t_1$. At this stage, base and collector voltages $V_{B12}$ and $V_{C12}$ of second transistor 12 are maintained respectively in the saturation value $V_{BE}$ and zero value to produce an output signal with a high value from the output transistor 4, and the additional transistor 1 is maintained nonconductive such that the feedback capacitor 8 is positively charged at its one terminal 8a and negatively charged at its other terminal 8b, as previously described.

When the additional transistor 1 is turned on at time $t=T_2$, an electric voltage appearing at the positively charged terminal 8a of feedback capacitor 8 is lowered to instantaneously drop the base voltage $V_{B12}$ of second transistor 12, as shown at a point $A_1$ of FIG. 3. In other words, the base of second transistor 12 is biased negatively in voltage because the capacitance value $C_8$ of feedback capacitor 8 is selected such that the base voltage $V_{B11}$ shown at the point C of FIG. 2 accords with the base saturation voltage $V_{BE}$ of first transistor 11, as previously described. This means that the voltage drop at the point $A_1$ of FIG. 3 is much larger than that at the point A of FIG. 2 to turn off the second transistor 12 so as to produce an output signal with a zero value from the output transistor 4. Then, the collector voltage $V_{C12}$ instantaneously rises up to a high value, as shown at a point $B_1$ of FIG. 3, and the base voltage $V_{B11}$ of first transistor 11 instantaneously rises up to the saturation value $V_{BE}$, as shown at a point $C_1$ of FIG. 3.

From this description, it should be understood that the collector voltage $V_{C12}$ at the point $B_1$ is higher than that at the point B of FIG. 2, and the base voltage $V_{B11}$ of first transistor 11 at the point $C_1$ is higher than that at the point C of FIG. 2. As a result, the first transistor 11 is turned on, as shown at a point G of FIG. 3, in such a manner that the base of the second transistor 12 is biased negatively in voltage under control of the reference capacitor 17 to maintain nonconduction of second transistor 12. Conversely, the additional transistor 1 is turned off due to conduction of the first transistor 11 and the base voltage $V_{B12}$ of second transistor 12 gradually starts to rise up with a predetermined time constant defined by the resistance value of resistor 14 and the capacitance value $C_{17}$ of reference capacitor 17. In addition, shift operation from conductive state to nonconductive state of the additional transistor 1 shown in FIG. 3 is obtained earlier than that shown in FIG. 2, because the collector voltage $V_{C11}$ shown in FIG. 3 may not become higher than that shown in FIG. 2.

When the base voltage $V_{B12}$ of second transistor 12 rises up to the saturation value $V_{BE}$ at time $t=T_3$, the second transistor 12 is turned on to drop the collector voltage $V_{C12}$ to the zero value in response to which the base of first transistor 11 is biased negatively in voltage under control of the capacitor 18, as shown at a point $F_1$ of FIG. 3. Thus, the first transistor 11 is turned off to again conduct the same operation as that at time $t=T_1$. Thereafter, the above-noted operation is repeated to conduct oscillation in the oscillator circuit.

From the former and latter operational modes described above respectively in the items (1) and (2), it should be understood that the oscillator circuit under the latter operational mode serves to oscillate at a frequency higher than that at which the oscillator circuit oscillates under the former operational mode.

In case only the second transistor 12 of the oscillator circuit is exposed to variable ambient temperature under the latter operational mode described in the above item (2), the drop rate of the base voltage $V_{B12}$ influenced by the capacitance value $C_8$, as shown at point $A_1$ of FIG. 3 is relatively decreased in dependence upon decrease of the base saturation voltage $V_{BE}$ caused by increase of the ambient temperature. This means that the second transistor 12 may not be turned off in the same manner as that at time $t=t_2$ in FIG. 2 due to the relative decrease of the drop rate of the base voltage $V_{B12}$ and that the oscillator circuit is conditioned under the former operational mode described in the above item (1) or shown in FIG. 2. The above operation will be also obtained even if both the transistors 11 and 12 are exposed to the variable ambient temperature.

In case only the first transistor 11 is exposed to variable ambient temperature under the former operational mode described in the above item (1), the rising rate of the base voltage $V_{B11}$ influenced by the capacitance value $C_8$, as shown at point C of FIG. 2 is relatively increased in dependence upon decrease of the base saturation voltage $V_{BE}$ of transistor 11 caused by increase of the ambient temperature. This means that the first transistor 11 may be turned on in the same manner as that at time $t=T_2$ in FIG. 3 due to the relative increase of the rising rate of the base voltage $V_{B11}$ and that the oscillator circuit is conditioned under the latter operational mode described in the above item (2) or shown in FIG. 3.

Figure 4:
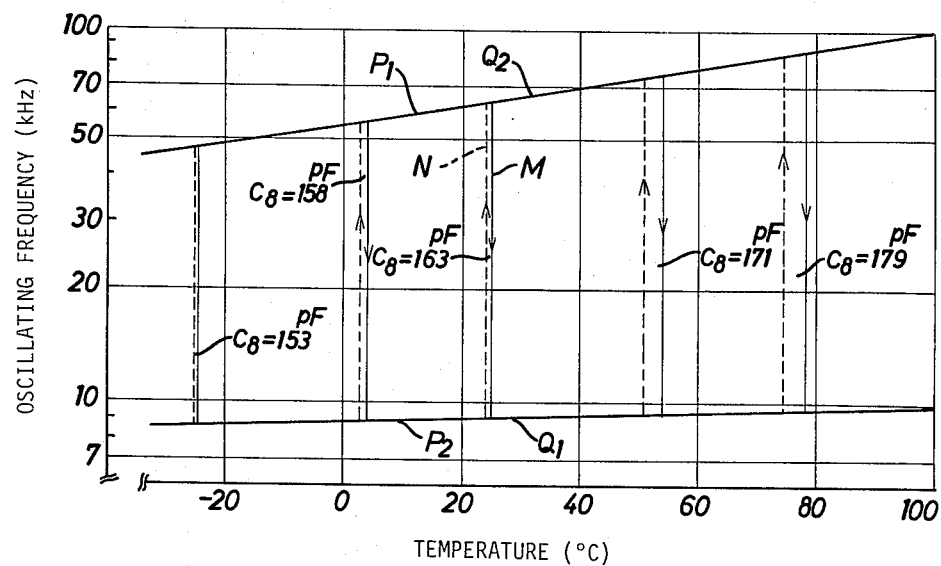
FIG. 4 is a graph illustrating relationship between an oscillating frequency of the oscillator circuit and ambient temperature in consideration with a capacitance value of the feedback capacitor of FIG. 1.

As a result of experimentation of the embodiment, the inventors have obtained a plurality of characteristic curves respectively indicative of relationship between oscillating frequency of the oscillator circuit and variable ambient temperature around the first and/or second transistors 11 and 12 in consideration with change of the capacitance value $C_8$ of feedback capacitor 8, as shown in FIG. 4.

In case only the second transistor 12 is exposed to the variable ambient temperature and the capacitance value $C_8$ is selected in a value of, for example, 163 pF, an oscillating frequency at ambient temperature of about 15° C. takes a high value of about 60 kHz given on a solid line $P_1$ of FIG. 4. When the variable ambient temperature increases, the oscillating frequency takes a low value of about 9 kHz at about 25° C. defined by a solid line M of FIG. 4 and thereafter takes a low value given on a solid line $Q_1$ of FIG. 4. When the variable ambient temperature decreases, the oscillating frequency takes a high value of about 61.5 kHz at ambient temperature of about 24° C. defined by a dotted line N of FIG. 4. In other words, the value of the oscillating frequency changes from the solid line $P_1$ to the solid line $Q_1$ through the solid line M in dependence upon increase of the ambient temperature but changes from the solid line $Q_1$ to the solid line $P_1$ through the dotted line N in dependence upon decrease of the ambient temperature. In this case, if the capacitance value $C_8$ is selected in another value of 171 pF, the oscillating frequency changes from a high value to a low value at ambient temperature of about 54° C. but changes from a low value to a high value at ambient temperature of about 51° C.

From the above description, it will be understood that in case only the second transistor 12 is exposed to variable ambient temperature, sudden change of an oscillating frequency of the oscillator circuit from a high value to a low value or vice versa is given at ambient temperature of a predetermined value relative to the capacitance value $C_8$ of feedback capacitor 8. These characteristics are also obtained even if both the first and second transistors 11 and 12 are exposed to the variable ambient temperature.

In case only the first transistor 11 is exposed to variable ambient temperature and the capacitance value $C_8$ is selected in a value of 163 pF, a value of the oscillating frequency changes from a solid line $P_2$ to a solid line $Q_2$ through the solid line M in dependence upon increase of ambient temperature but changes from the solid line $Q_2$ to the solid line $P_2$ through the dotted line N in dependence upon decrease of the ambient temperature.

From the above description, it will be understood that in case only the first transistor 11 is exposed to variable ambient temperature, sudden change of an oscillating frequency of the oscillator circuit from a low value to a high value or vice versa is given at ambient temperature of a predetermined value relative to the capacitance value $C_8$.

Figure 5:
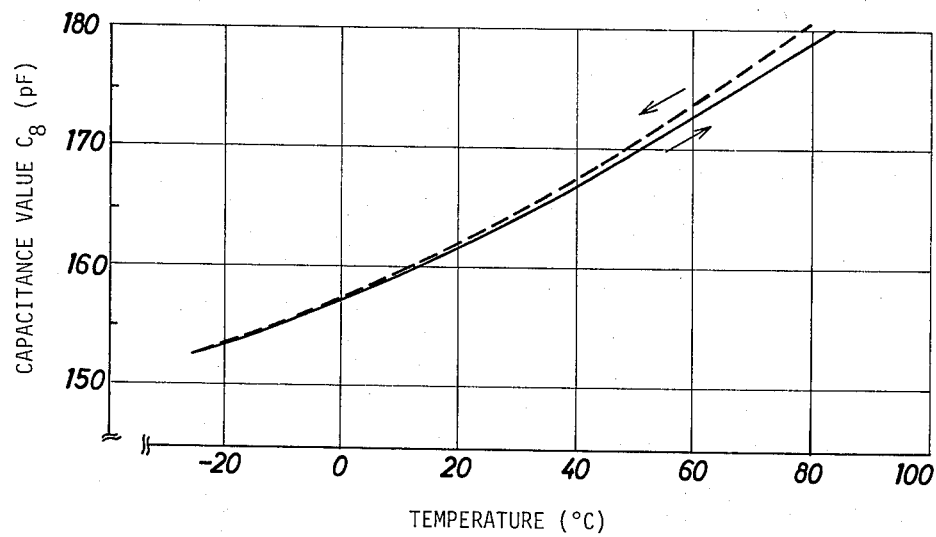
FIG. 5 is a graph illustrating relationship between a capacitance value of the feedback capacitor and ambient temperature in consideration with a point at which an oscillating frequency of the oscillator circuit suddenly changes.

As a result of the above experimentation, the inventors have also obtained a pair of characteristic curves respectively indicative of relationship between the capacitance value $C_8$ and variable ambient temperature in consideration with respective points at which an oscillating frequency of the oscillator circuit suddenly changes from a high value to a low value or vice versa, as shown in FIG. 5. In case the capacitance value $C_8$ is selected in a value of, for instance, 165 pF, FIG. 5 illustrates that the oscillating frequency suddenly changes at ambient temperature of about 30° C. In the experimentation, a resistance value of each of resistors 3, 13 and 16 is determined 11 kiloohms, a resistance value of each of the resistors 2, 14 and 15 is determined 100 kiloohms, and a capacitance value of each of the capacitors 17 and 18 is determined 1000 pF. Additionally, a transistor of 2SC735 manufactured by Tokyo Shibaura Denki Kabushiki Kaisha in Japan is used as each of transistors 1, 11 and 12.

From all the above descriptions, it will be clearly understood that a sudden changing point of an oscillating frequency of the oscillator circuit in accordance with the present invention is defined by the capacitance value $C_8$ of capacitor 8 relative to the capacitance value $C_{17}$ of capacitor 17 in consideration with change of the base saturation voltage $V_{BE}$ caused by variation of ambient temperature around the transistors 11 and/or 12.

Figure 6:
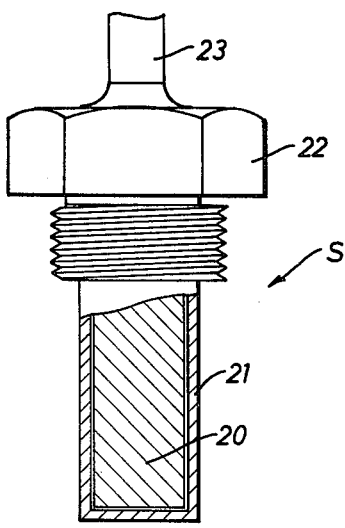
FIG. 6 illustrates an example of a temperature sensor including the oscillator circuit in accordance with the present invention.

FIG. 6 illustrates an example in which the above-noted oscillator circuit in accordance with the present invention is utilized as a signal generator of a temperature sensor s to detect coolant temperature of an engine coolant system for an automotive vehicle. In the example, it is assumed that the capacitance value $C_8$ of the oscillator circuit is selected in a predetermined value in such a manner as to detect a desired value of the coolant temperature. The temperature sensor s comprises a cylindrical casing 21 to be immersed into the coolant of the engine coolant system. The casing 21 is provided therein with the oscillator circuit shown by the reference numeral 20 in FIG. 6 and is made of metal with high thermal conductivity such as copper and the like to easily conduct the coolant temperature to the electric elements of the oscillator circuit 20 therethrough. The open end of casing 21 is hermetically closed by a bolt-shaped cap 22 to be fastened to a portion of a cylinder block of the engine. In addition, the reference numeral 23 indicates a rubber cover to protect leading wires extending out from the oscillator circuit 20 through the cap 22.

In case the temperature sensor s is fastened by a screwed portion of cap 22 to the portion of the cylinder block to immerse the casing 21 into the coolant, temperature of the coolant is conducted to the electric elements of oscillator circuit 20 by the casing 21. When the coolant temperature rises up to the desired value, an oscillating frequency of the oscillator circuit 20 suddenly changes from a high value to a low value, as previously described. Then, the temperature sensor s serves to produce an output signal in response to the sudden change of the oscillating frequency. This means that the temperature sensor s detects the sudden change of the oscillating frequency as the output signal.

Figure 7:
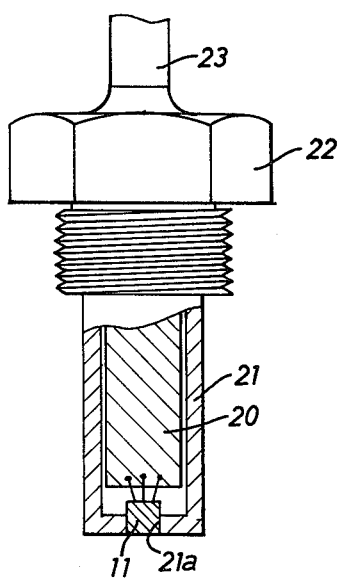
FIG. 7 illustrates a modification of the example shown in FIG. 6.

FIG. 7 illustrates a modification of the above example in which a through hole 21a is formed in the bottom of casing 21, and only the first transistor 11 is mounted within the through hole 21a to directly contact with the coolant. With this modification, temperature of the coolant is directly conducted to the first transistor 11 to facilitate the above-noted detection of the desired coolant temperature by the sensor s.

Although in the above embodiment an NPN transistor is used as each of the transistors 1, 11 and 12, a PNP transistor may be also used as the same transistors. In this case, a transistor circuit formed by a Darlington connection and the like may be used as each of the transistors 11, 12.

For practice of the present invention, a switching circuit formed by a plurality of transistors may be adapted in replacement of the additional transistor 1. In this case, the switching circuit may be cooperable with a photocoupler to receive thereto the collector voltage $V_{C11}$ of first transistor 11.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An oscillator circuit responsive to a predetermined ambient temperature, comprising:
    an astable multivibrator including a first transistor, and a second transistor connected at its input terminal to the output terminal of said first transistor through a first capacitor and at its output terminal to the input terminal of said first transistor through a second capacitor, each of said capacitors being connected between a pair of resistors for defining a pair of time constants, and at least one of said transistors being arranged to be exposed to an ambient temperature;
    first means for receiving an output voltage appearing at the output terminal of said first transistor and for producing an inverted output voltage with a predetermined time delay; and
    second means responsive to the inverted output voltage from said first means for applying a bias voltage to said first capacitor and the input terminal of said second transistor at opposite voltage polarity relative to that of a terminal voltage appearing across said first capacitor, the value of said bias voltage being determined in such a way to turn off one of said transistors in relation to said bias voltage when the ambient temperature becomes the predetermined one.

2. An oscillator circuit as claimed in claim 1, wherein said first means includes a switching transistor connected at its input terminal to the output terminal of said first transistor for applying an inverted output voltage to said second means.

3. An oscillator circuit as claimed in claim 1, wherein said second means is an additional capacitor responsive to the inverted voltage from said first means for applying a terminal bias voltage thereacross to said first capacitor and the input terminal of said second transistor at opposite voltage polarity relative to that of a terminal voltage appearing across said first capacitor, said additional capacitor having a predetermined capacitance value determined in such a way to turn off one of said transistors in relation to said terminal bias voltage when the ambient temperature becomes the predetermined one.

4. An oscillator circuit responsive to a predetermined ambient temperature, comprising:
   an astable multivibrator including a first transistor, and a second transistor connected at its input terminal to the output terminal of said first transistor through a first capacitor and at its output terminal to the input terminal of said first transistor through a second capacitor, each of said capacitors being connected between a pair of resistors for defining a pair of time constants, and at least one of said transistors being arranged to be exposed to an ambient temperature;
   a switching transistor for receiving at its input terminal an output voltage appearing at the output terminal of said first transistor and for producing an inverted output voltage at its output terminal with a predetermined time delay; and
   an additional capacitor responsive to the inverted output voltage from said switching transistor for applying a terminal bias voltage thereacross to said first capacitor and the input terminal of said second transistor at opposite voltage polarity relative to that of a terminal voltage appearing across said first capacitor, said additional capacitor having a predetermined capacitance value determined in such a way to turn off one of said first and second transistors in relation to said terminal bias voltage when the ambient temperature becomes the predetermined one.

* * * * *